US005502809A

United States Patent [19]

Takano

[11] Patent Number: 5,502,809

[45] Date of Patent: Mar. 26, 1996

[54] IMAGE STORAGE OF A CHANGEABLE DISPLAY

[75] Inventor: Hajime Takano, Tokyo, Japan

[73] Assignee: NEC Corporation, Japan

[21] Appl. No.: 301,874

[22] Filed: Sep. 6, 1994

[30] Foreign Application Priority Data

Sep. 16, 1993 [JP] Japan .................................... 5-229993

[51] Int. Cl.[6] ...................................................... G06F 12/00

[52] U.S. Cl. ............................................ 395/164; 345/201

[58] Field of Search .................................... 395/157, 158, 395/162–166; 345/119, 120, 185, 201

[56] References Cited

U.S. PATENT DOCUMENTS 4,816,815 3/1989 Yoshiba .................................. 345/201

*Primary Examiner*—Raymond J. Bayerl
*Assistant Examiner*—Kee M. Tung
*Attorney, Agent, or Firm*—Laff, Whitesel, Conte & Saret, Ltd.

[57] ABSTRACT

A VRAM for storing saved images are provided for quick transfer of images to a VRAM for storing displayed images. An image controller controls transfer of images among VRAM for storing displayed images, VRAM for storing saved images, and RAM for storing saved images. An optimizer allocates VRAM for storing saved images to minimize average time required for a change of display.

3 Claims, 4 Drawing Sheets

IMAGE STORAGE OF A CHANGEABLE DISPLAY

BACKGROUND OF THE INVENTION

This invention relates to image storage of a changeable display, particularly in a window system. In a window system, several windows are displayed on a screen of display, stacked(or overlapped) to each other. In each window, a picture is displayed, and a part of the picture overlapped by other windows, is not displayed on the screen. Sequence of windows in the stack is changed rather frequently, and a window in a lower part of the stack will come at the top of the stack where the whole picture of the window must be displayed on the screen.

For such a quick change of a display, a BitBLT (Bit Block Transfer) hardware is provided for transferring a block data from one area of memory to another in a very short time.

As for a quick change of a character display, font images of characters are also stored in the VRAM, and a font image of a character is transferred to a desired position in the VRAM by the BitBLT hardware through specifying the identifier of the font image.

But when another set of a stack of windows is to be displayed on the screen, the picture images stored in the VRAM for storing displayed images must first be transferred to an area of a main memory reserved as RAM for storing saved images. After the images of current display are saved in the RAM for storing saved images, a set of new images is transferred from the RAM to the VRAM for storing displayed images.

For the transfer between the VRAM for storing displayed images and the RAM in the main memory for storing saved images, a system bus is used, and a fairly longer time is required for signal transmission compared with that by the BitBTL hardware. Therefore, in a heretofore known image storage of a window system, it has taken a fairly long time to display saved images once more on the screen.

SUMMARY OF THE INVENTION

Therefore, a primary object of this invention is to provide a new image storage of a window system wherein previously saved images can be displayed once more in a very short time. In order to achieve this object, a second VRAM is provided for storing saved images, and images expected to be displayed again in a near future is saved in the second VRAM, and from the second VRAM for storing saved images to the first VRAM for storing displayed images, signals are transmitted by the BitBTL hardware.

Another object of this invention is to reduce a burden of an application program. Images of windows in a display are dynamic data which may change in accordance with requirements from the application program, and images to be stored in the second VRAM and images to be stored in the main memory must be changed accordingly. When this change of storage place is controlled by the application program, it will be a burden to the program. To reduce the burden, an image controller is provided in the image storage of this invention, for receiving simple commands from the application program and controlling relocation programs of the images.

Still another object of this invention is to keep an optimum relocation of images whereby an average time of change of display is made minimum.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
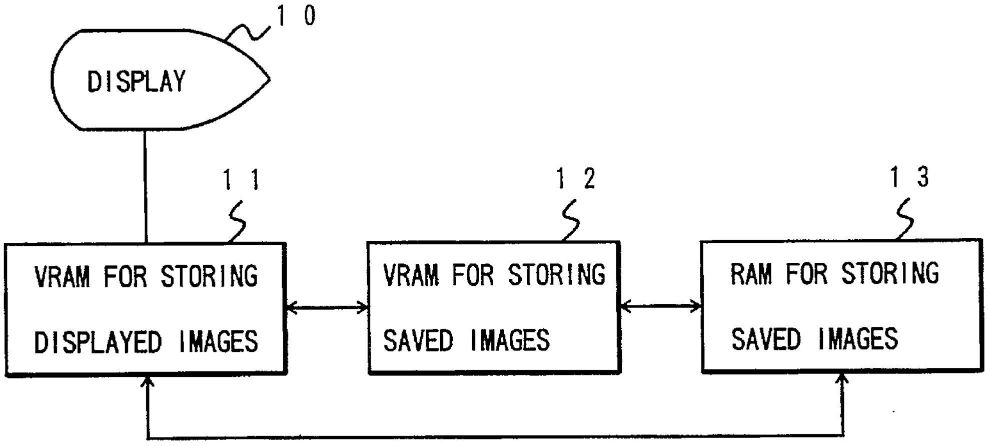
FIG. 1 is a block diagram of an embodiment of this invention.

Referring to FIG. 1, a display 10 scans images stored in a first VRAM for storing displayed images 11, and displays scanned images on a screen. Images expected to be displayed in a future are stored in a second for storing saved images 12, and in a RAM for storing saved images 13.

Figure 2:
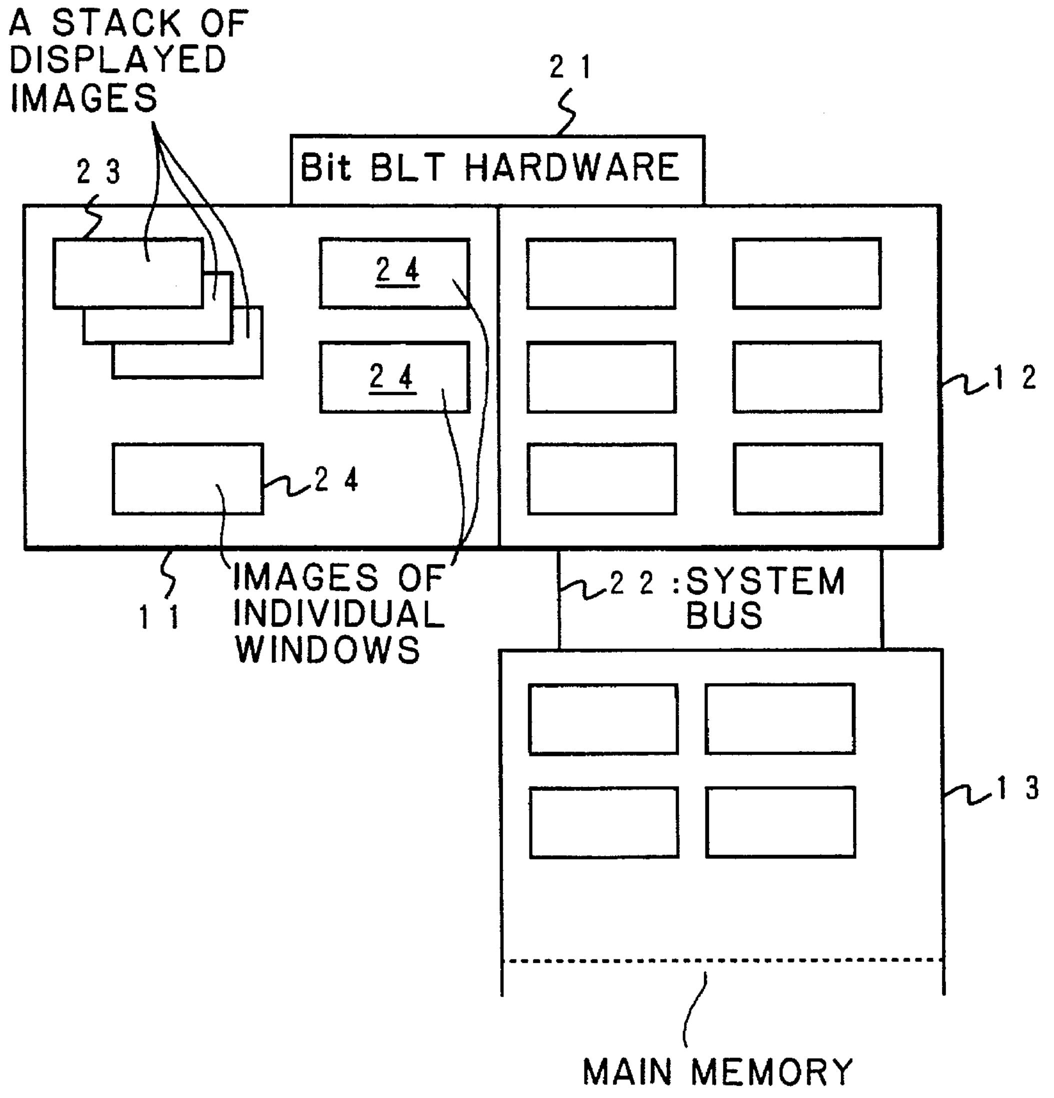
FIG. 2 shows image storage in FIG. 1.

As shown in FIG. 2, the VRAM 11 for storing displayed images stores a stack of images 23 scanned by the display 10 and displayed on the screen. Images of each window 24 composing the stack of images 23 are also stored in the VRAM 11 for storing displayed images. For a change of sequence in the stack, images are transferred from subwindow images 24 to stacked images 23 by a BitBLT hardware 21.

In this invention, the VRAM 12 for storing saved images is provided for storing saved images. For image transfer between the VRAM for storing displayed images 11 and the VRAM 12 for storing saved images, the BitBLT hardware 21 is used.

As for image transfer between VRAM 11 and the RAM 13, or between VRAM 12 and the RAM 13, a system bus 22 is used.

When images stored in the VRAM 11 are to be saved, they are transferred to the VRAM 12, and when there is not a sufficient vacant memory capacity in the VRAM 12, the images in the VRAM 11 are saved in the RAM 13. After the images in the VRAM 11 are saved, new images from the VRAM 12 or from the RAM 13 are transferred to the VRAM 11 to be newly displayed.

Figure 3:
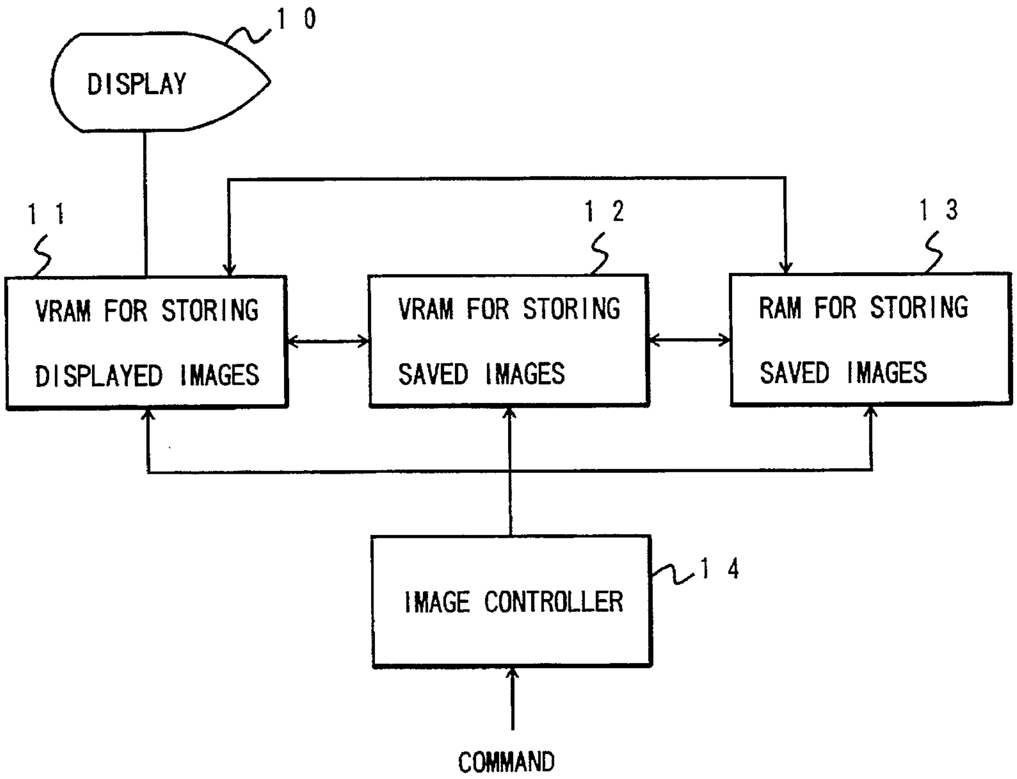
FIG. 3 shows a block diagram of another embodiment of this invention.

Referring now to FIG. 3, an image controller 14 is further provided to the image storage of FIG. 1. In an embodiment shown by FIG. 3, an application program ( not shown in the drawing ) issues display change command to the image controller 14. The display change command may consist of a pair of commands: that is, "save the images displayed" and "display an object set of images of No-".

For the first command, the image controller 14 searches vacant memory capacity in VRAM 12, and when there is a sufficient vacant capacity, transfers the images in the VRAM 11 to the VRAM 12. When there is not a sufficient vacant capacity in the VRAM 12, the controller 14 transfers the images in the VRAM 11 to the RAM 13.

The VRAM 11 will be vacant after the first command is executed. Then the controller 14 executes the second command. The controller 14 determines the object set of images from the No. designated by the command, and transfers the set of images to the VRAM 11.

Figure 4:
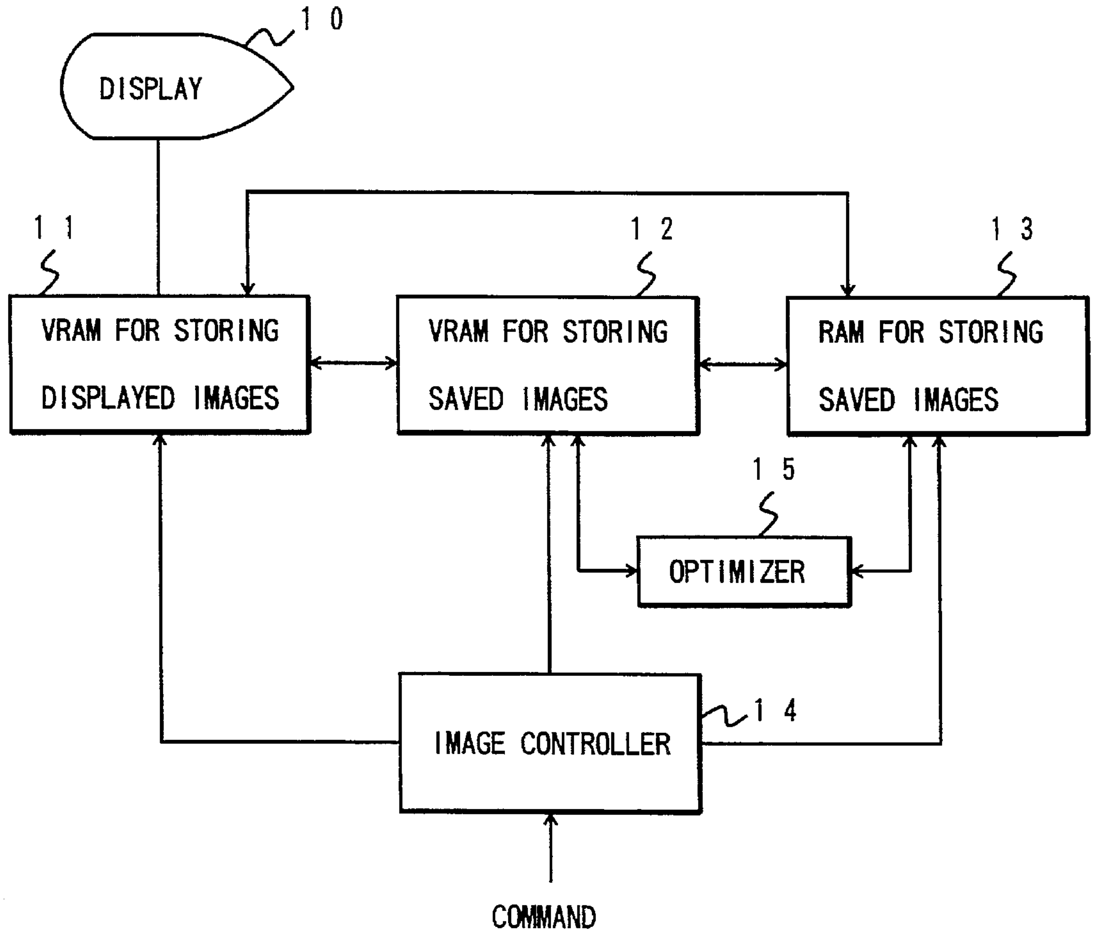
FIG. 4 shows a block diagram of still another embodiment of this invention.

FIG. 4 is a block diagram of still another embodiment of this invention, wherein an optimizer 15 is further provided in the image storage shown in FIG. 3. The optimizer 15 keeps a best allocation of the VRAM 12 for minimizing average time required for a display change.

Figure 5:
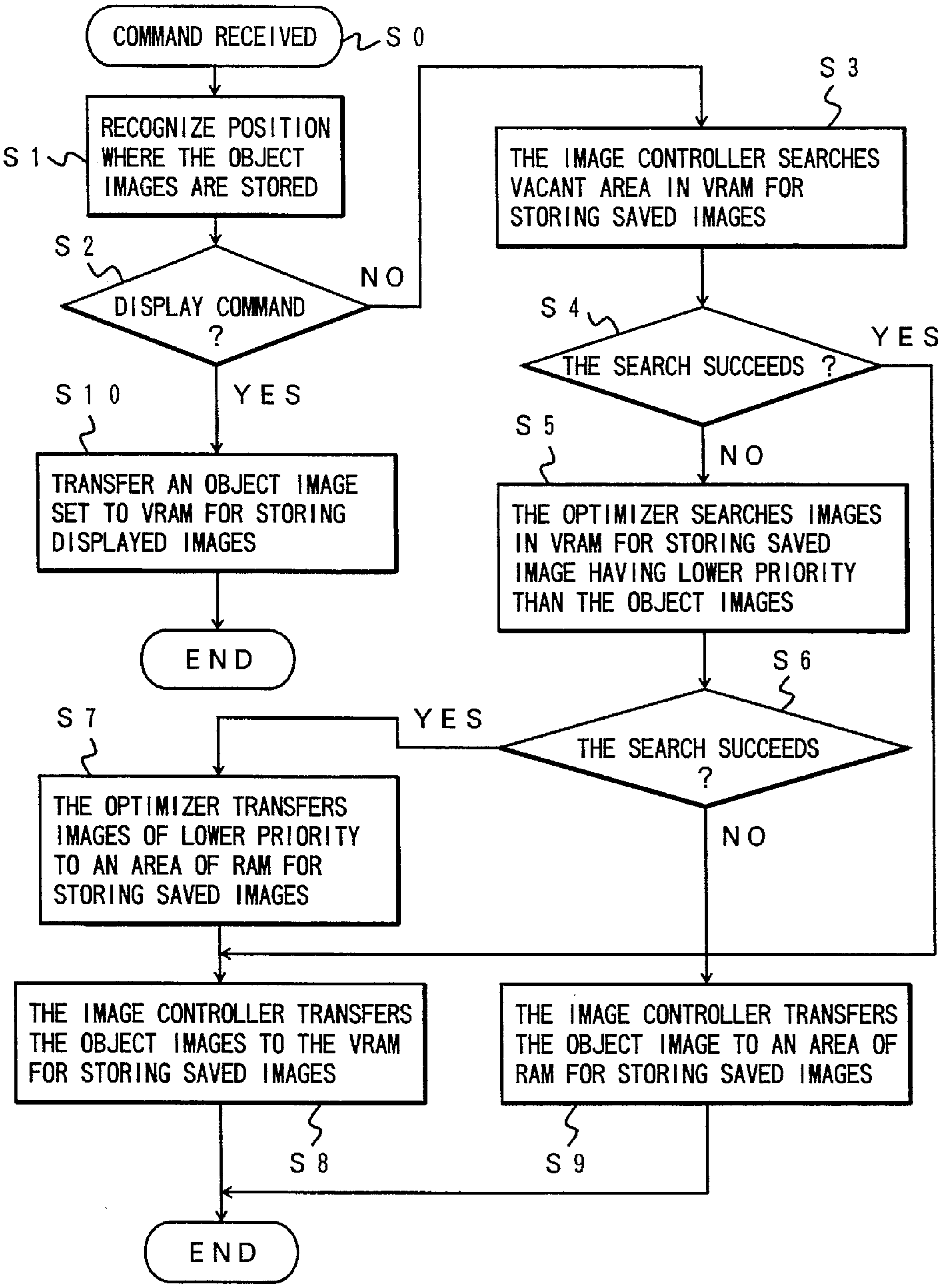
FIG. 5 shows a flowchart of a performance of an apparatus shown by FIG. 4.

FIG. 5 shows a flowchart of a performance of the apparatus of FIG. 4, which will be described in connection with FIG. 4 and FIG. 5. Assume that display change command consists of a pair of commands: that is, "save the images displayed" and "display an object set of images of No-".

At step S0, a command is received. At step S1, the image controller 14 recognizes position where the object images are stored from the No. in the command. When the command is "save the images displayed", the step S1 is ignored, and the step goes to S2. "Save the image" command is not a display command, and the step goes to S3. When there is a vacant area in VRAM 12 for storing saved images, the step goes to S4–S8, and the saved images are stored in the VRAM 12.

When the answer at the step S4 is NO, the step goes to step S5, where the optimizer 15 compares priorities of the images stored in the VRAM 12 to that of the images to be saved. When there are images having lower priority than that of the images to be saved, the step goes to step S7, where the optimizer 15 transfers the images of the lower priority to the RAM 13. The step goes from S7 to S8. When there is no images having priority lower than the images to be saved, the step goes to S9 where the object image is saved in the RAM 13.

Usually, a lately displayed images are considered to have a higher chance of being newly displayed, and the lately displayed images are given the higher priority. When this is the case, the answer at the step S6 is always YES. When the step S7 is executed in advance, the answer of the step S4 is always YES, and the step can go to the step S8.

In order to execute the step S7 in advance, the optimizer 15 is watching the contents of the VRAM 12, and when the VRAM 12 comes to a state of no vacancy, the optimizer 15 automatically issues a command saying, for example, "save the object images No.-", indicating images stored in the VRAM 12 having the lowest priority. At the step S1, it is confirmed that the object images are in the VRAM 12, and the step goes S2-S3-S4-S5-S6-S7, to transfer the indicated images from the VRAM 12 to the RAM 13.

On the other hand, when the optimizer 15 finds unnecessary vacancy in the VRAM 12, the optimizer 15 can transfer images stored in the RAM 13 to the VRAM 12. In this case, the command may be "save the object images No.-" indicating images stored in the RAM 13. At the step 1, it is confirmed that the object images are in the RAM 13, and the step goes S2-S3-S4-S8, to transfer the object images to the VRAM 12.

Heretofore, this invention is described as applied to a window system, but, it is apparent that this invention can be applied for image storage of any changeable display.

What is claimed is:

1. An image storage of a changeable display comprising:

a display for displaying images, a first VRAM (Video RAM) coupled to said display for storing displayed images, a second VRAM coupled to said first VRAM for storing saved images, a BitBLT hardware means coupled to said first and second VRAMs for transferring images between said first VRAM and said second VRAM, a RAM main memory means coupled to said first and second VRAMs for storing saved images, an image controller coupled to at least one of said VRAMs and RAM for controlling image transfer among said first VRAM, said second VRAM, and said RAM for storing saved images, and an optimizer means coupled to at least said second VRAM for keeping optimum allocation of said second VRAM in accordance with a priority assigned to each image.

2. An image storage of a changeable display of claim 1, wherein said RAM for storing saved images is in an area of a main memory.

3. An image storage of a changeable display of claim 1, wherein said priority is assigned to each image in accordance with a nearness of a latest display of the image.

* * * * *